United States Patent [19]
Hartmann

[11] 3,858,843
[45] Jan. 7, 1975

[54] BALL VALVE AND THE LIKE HAVING LOCKING HANDLE

[75] Inventor: Leonard Joseph Hartmann, Maplewood, Mo.

[73] Assignee: Chemetron Corporation, Chicago, Ill.

[22] Filed: Apr. 11, 1974

[21] Appl. No.: 460,235

Related U.S. Application Data
[63] Continuation of Ser. No. 345,845, March 29, 1973, abandoned.

[52] U.S. Cl. .................................................. 251/99
[51] Int. Cl. ............................................. F16k 35/00
[58] Field of Search ...................... 251/96, 98, 99

[56] References Cited
UNITED STATES PATENTS

| | | | |
|---|---|---|---|
| 843,996 | 2/1907 | Broomell | 251/99 |
| 907,248 | 12/1908 | Koehler | 251/99 |
| 932,188 | 8/1909 | Strelezky | 251/99 |
| 952,121 | 3/1910 | Koehler | 251/99 |
| 952,743 | 3/1910 | Jenkins | 251/99 |
| 1,131,224 | 3/1915 | Ellwood | 251/99 |
| 1,550,108 | 8/1925 | Sheafe | 251/98 |
| 1,744,877 | 1/1930 | Freud | 251/99 |
| 3,098,636 | 7/1963 | Contella | 251/98 |
| 3,329,394 | 7/1967 | Overbaugh | 251/99 |

*Primary Examiner*—William R. Cline
*Assistant Examiner*—Gerald A. Michalsky
*Attorney, Agent, or Firm*—N. M. Esser

[57] ABSTRACT

In a valve of the type comprising a housing having a conduit for fluid flow, a closure relatively mounted within the housing, a stem operatively associated with the closure, and a handle operatively associated with the stem, the handle is displaceable relative to the stem between a position wherein the handle clears the housing for conjoint rotation of the handle with the stem and the closure and a position wherein the handle is adapted to engage the housing to prevent unintentional opening of the valve if the valve is closed and unintentional closing of the valve if the valve is opened.

3 Claims, 4 Drawing Figures

PATENTED JAN 7 1975 3,858,843

BALL VALVE AND THE LIKE HAVING LOCKING HANDLE

This is a continuation of application Ser. No. 345,845, filed Mar. 29, 1973 now abandoned.

BACKGROUND OF THE INVENTION

This invention pertains to ball valves and other valves of the type comprising a housing having a conduit for fluid flow, a closure rotatably mounted within the housing, a stem operatively associated with the closure, and a handle operatively associated with the stem. Ball valves of this type are exemplified in U.S. Pat. Nos. 3,679,170, 3,674,052, and 3,684,241.

A conventional ball valve is somewhat unsatisfactory for many applications. As discussed in U.S. Pat. No. 3,679,170, the handle of a conventional ball valve, when positioned in transverse relation to the housing so as to close the valve shown in such patent, easily can be bumped by an operator so as to cause unintentional opening of the valve. Such patent discloses an arrangement intended to prevent unintentional opening of such a ball valve. Furthermore, the handle either of a conventional ball valve or of the improved ball valve disclosed in such patent easily can be jarred, as by random vibrations, from the fully opened condition of the valve.

SUMMARY OF THE INVENTION

Accordingly, one object of this invention is to provide an improvement in a valve of the type described above whereby both unintentional opening and unintentional closing of the valve are prevented. Another object of this invention is to provide a valve of the type described above wherein the handle releasably locks the valve in either a fully opened or a fully closed condition.

Generally, these objects may be attained in a valve comprising a housing having a conduit for fluid flow, a closure rotatably mounted within the housing and adapted to close the conduit when rotated to one position relative to the housing and to open the conduit when rotated to another position relative to the housing, a stem operatively associated with the closure for conjoint rotation with the closure, and a handle operatively associated with the stem for conjoint rotation with the stem and the closure. The handle is displaceable relative to the stem between one position wherein the handle clears the stem and another position wherein the handle is adapted to engage the housing to prevent unintentional opening of the valve if the valve is closed and unintentional closing of the valve if the valve is opened.

DESCRIPTION OF PREFERRED EMBODIMENT

Figure 1:
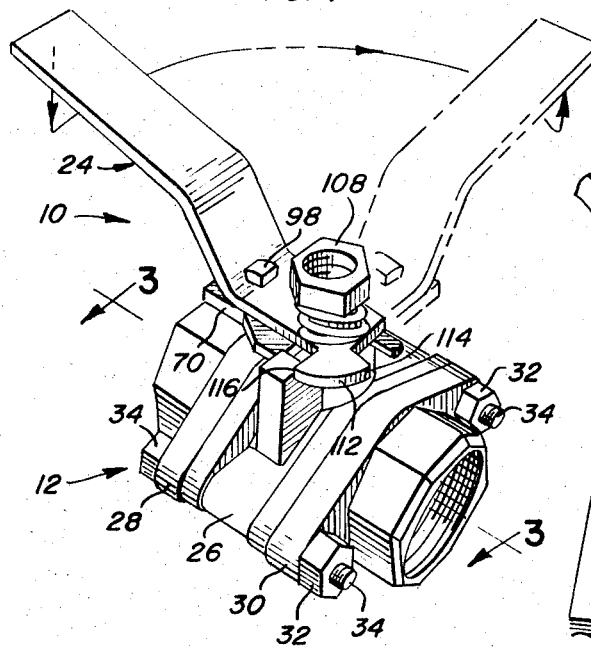
FIG. 1 is an isometric view showing a valve embodying the features of this invention and indicating a range of rotational positions for the handle of the valve.
Figure 2:
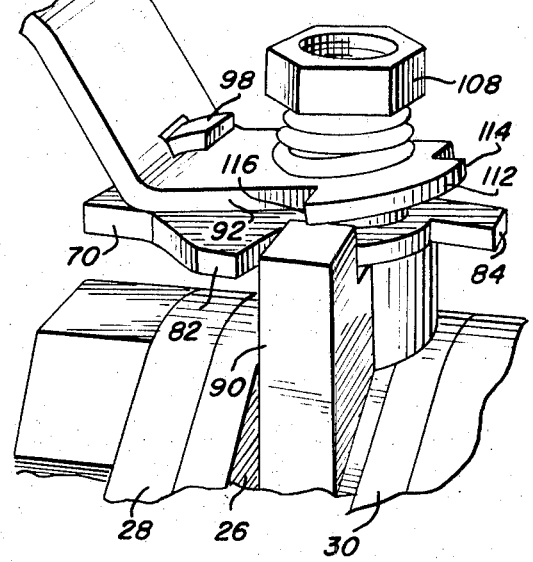
FIG. 2 is an enlargement, from a slightly different vantage, of certain details of the valve of FIG. 1 with the handle positioned in a pivotally displaced position and rotated slightly.
Figure 3:
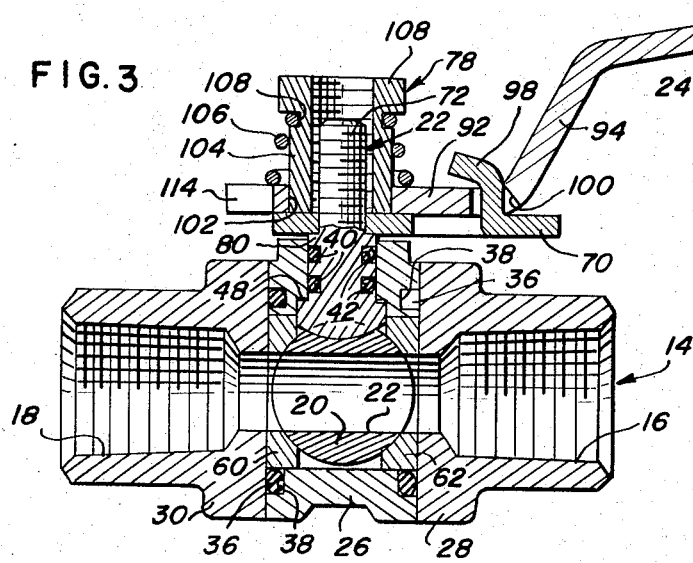
FIG. 3 is a longitudinal sectional view taken substantially along line 3—3 of FIG. 1.
Figure 4:
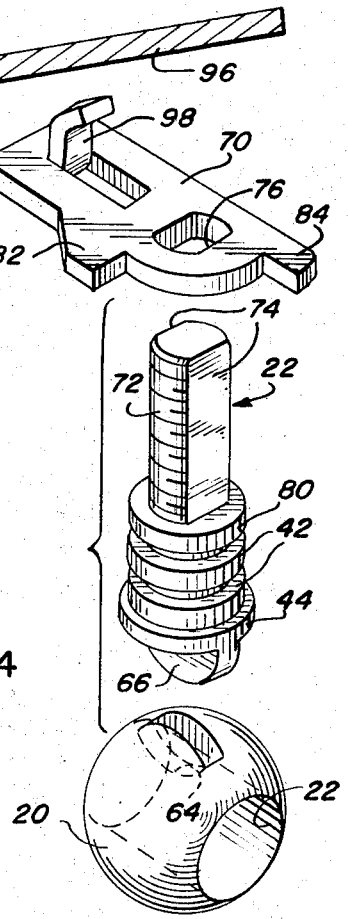
FIG. 4 is an enlarged exploded view of certain parts of the valve of FIG. 1.

FIGS. 1 through 3 illustrate an improved ball valve 10 embodying the features of this invention. The valve 10 generally comprises a housing 12 having a conduit 14 for fluid flow between opposite threaded end portions 16 and 18 respectively of the conduit 14, a ball-type closure 20 rotatably mounted within the housing 12, a stem 22 operatively associated with the closure 20, and a handle 24 operatively associated with the stem 22. The closure 20, which has a diametrically oriented bore 22 (FIGS. 3 and 4), is interposed between the threaded end portions 16 and 18 of the conduit 14 and thus is adapted to prevent fluid flow through the conduit 14 when rotated to certain positions relative to the housing 12 and to permit fluid flow through the conduit 14 when rotated to other positions relative to the housing 12.

In FIG. 3, the closure 20 is shown in one such rotated position, in which the bore 22 communicates with the conduit 14 to permit fluid flow through the conduit 14.

The housing 12 comprises an intermediate body portion 26 mounted between flanged nipples 28 and 30 respectively by locking nuts 32 threaded to hex-headed bolts 34. The respective flanged nipples 28 and 30 are threaded internally to form the threaded end portions 16 and 18 respectively of the conduit 14. O-rings 36 are positioned in suitable grooves 38 respectively in opposite faces of the intermediate body portion 26 to provide annular fluid-tight seals, between the respective portions of the housing 12. O-rings 40 are positioned in suitable grooves in the stem 22 to provide annular fluid-tight seals between the stem 22 and the intermediate body portion 26 of the housing 12. The stem 22 has an annular shoulder portion 44 (FIG. 4) adapted to receive an annular thrust washer. The annular shoulder portion 44 and the annular thrust washer are recessed within an annular recess 48, which is formed in the intermediate body portion 26 of the housing 12, to prevent the stem 22 from being pulled from the housing 12.

The closure 20 is rotatably mounted within the intermediate body portion 26 of the housing 12 between upper and lower annular valve seats 60 and 62 disposed between the respective flanged nipples 28 and 30. The closure 20 is formed with a keyway 64 adapted to receive a key 66 formed on an inner end portion of the stem 22. Thus, the stem 22 and the closure 20 are associated for conjoint rotation of the stem 22 and the closure 20 about an axis normal to the axis of the bore 22 of the closure 20. The key 66 and the keyway 64 are so formed as to prevent any rotation of the closure 20 about other axes.

The handle 24 is operatively associated with the stem 22 through a plate 70. The stem 22 has a threaded shank portion 72 formed with parallel flats 74. The threaded shank portion 72 extends through a slot 76 of complementary shape in the plate 70 and receives an elongated cap nut 78 to mount the plate 70 against an annular shoulder portion 80 of the stem 22. Thus, the stem 22 is keyed to the plate 70 for conjoint rotation.

The plate 70 is formed with angularly spaced tab portions 82 and 84 respectively adapted to engage opposite surfaces of an upstanding columnar extension or abutment 90 of the intermediate body portion 26 of the housing 12 to limit, in either direction through a range of angular displacement of approximately 90°, conjoint rotation of the handle 24, the plate 70, the stem 22, and the closure 20. In one such limiting position, in which the handle 24 is shown in full lines in FIG. 1, the closure 20 allows fluid flow through the conduit 14. In the other limiting position, in which the handle 24 is shown in phantom lines in FIG. 1, the bore 22 of the closure 20 communicates with the conduit 14 to prevent fluid flow through the conduit 14. As exemplified in U.S. Pat. No. 3,679,170, similar arrangements have been provided on the handles of known valves of the type to which this invention pertains.

The handle 24 is bent doubly, as shown in FIG. 3, to provide a base portion 92, an intermediate portion 94, and a grip portion 96. The handle 24 is connected to the plate 70 for pivotal displacement relative to the plate 70, and thus relative to the stem 22, about a fulcrum defined by a tongue 98 pierced from the plate 70 and extended through a slot 100 formed in the handle 24 where the base portion 92 joins the intermediate portion 94. The base portion 92 is formed with an opening 102 adapted to receive the shank 104 of the threaded cap nut 78 with sufficient clearance to permit pivotal displacement of the handle 24 relative to the plate 70, and thus relative to the stem 22, between certain positions of the handle 24 wherein the base portion 94 lies flatly against the plate 70, as in FIGS. 1 and 3, and other pivotally displaced positions of the handle 24, as in FIG. 2.

A generally conical spring 106, which is piloted around the shank 104 of the threaded cap nut 78 between the head 108 of the threaded cap nut 78 and the base portion 92 of the handle 24, biases the handle to the position of the handle 24 (relative to the plate 70) in FIG. 3. A smaller end portion of the spring 106 is wound within a groove 108 formed in the shank 104 of the threaded cap nut 78.

The base portion 92 of the handle 24 is formed with a tab portion 112 having opposite angularly spaced edges 114 and 116 respectively adapted to engage opposite surfaces of the upstanding columnar extension 90 of the intermediate body portion 26 of the housing 12 to lock the handle 24 releasably either in the one limiting position in which the handle 24 is shown in phantom lines in FIG. 1 or in the other limiting position in which the handle 24 is shown in full lines in FIG. 1, when the base portion 94 of the handle 24 lies flatly against the plate 70, as in FIGS. 1 and 3. The handle 24 can be released for conjoint rotation of the handle 24 and the plate 70 together with the stem 22 and the closure 20, as in FIG. 2, by pivotal displacement of the handle 24 about the fulcrum formed by the tongue 98 extended through the slot 100 to a position of the handle 24 relative to the plate 70 such that the tab portion 112 clears the upstanding columnar extension 90.

To close the valve 10 from its fully opened condition, an operator merely depresses the grip portion 96 of the handle 24, such that the handle is displaced pivotally relative to the stem 22 to a position wherein the handle 24 clears the housing 12, to permit the handle 24 to be rotated to its clockwise limiting position (phantom lines in FIG. 1). To open the valve 10 from its fully closed condition, the operator merely depresses the grip portion 96 of the handle 24, such that the handle 24 similarly clears the housing 12, to permit the handle 24 to be rotated to its counterclockwise limiting position.

I claim:

1. A valve comprising: a housing having a conduit for fluid flow and one external abutment;
    a closure rotatably mounted within said housing and adapted to prevent fluid flow through said conduit when rotated to a first rotated position relative to said housing and to permit fluid flow through said conduit when rotated to a second rotated position relative to said housing;
    a stem operatively associated with said closure for conjoint rotation of said stem with said closure said stem having a portion extending outside said housing;
    a handle having a grip portion and an end portion and being operatively associated with said stem for conjoint rotation of said handle with said stem and thus with said closure, said end portion having a first and second edges;
    a plate operatively associated with said stem portion for conjoint rotation of said plate with said stem and said closure relative to said housing and connected to said handle for pivotal displacement of said handle relative to said plate about a fulcrum located between the grip and end portions of said handle and thus relative to said stem and for conjoint rotation of said handle with said plate and thus said stem and said closure, said plate having a first portion and a second portion;
    means for biasing said handle toward said plate, said handle being pivotable about said fulcrum between a first pivoted position relative to said stem wherein the end portion of said handle clears said housing abutment to permit conjoint rotation of said handle with said stem and thus said closure through a range of angular displacement and a second pivoted position relative to said stem wherein, when said handle is rotated conjointly with said stem and said closure to said first rotated position of said closure relative to said housing, to prevent fluid flow, said first edge of the end portion of said handle and said first portion of said plate straddle said housing abutment to prevent conjoint rotation of said handle with said stem and said closure through said range of angular displacement to said second rotated position of said closure, and wherein, when said handle being pivoted to a first pivoted position wherein the end portion of said handle clears said housing abutment and a second pivoted position wherein said handle is rotated conjointly with said stem and thus said closure to said second rotated position of said closure, said second edge of the end portion of said handle and said second portion of said plate straddle said housing abutment to prevent conjoint rotation of said handle with said stem and said closure through said range of angular displacement to said first rotated position of said closure relative to said housing.

2. The valve of claim 1 wherein a tongue pierced from said plate extends through a slot formed in said handle to provide said fulcrum for pivotal displacement of said handle relative to said plate.

3. The valve of claim 2 wherein said stem extends through a sufficiently sized opening in said handle to permit pivotal displacement of said handle relative to said plate and wherein said stem restrains movement of said handle when said handle is in a location corresponding to said first and second rotated closure positions.

* * * * *

Disclaimer 3,858,843.—*Leonard Joseph Hartmann*, Maplewood, Mo. BALL VALVE AND THE LIKE HAVING LOCKING HANDLE. Patent dated Jan. 7, 1975. Disclaimer filed Sept. 28, 1977, by the assignee, *Chemetron Corporation*.

Hereby enters this disclaimer to all claims of said patent.

[*Official Gazette December 6, 1977.*]